United States Patent [19]

Coran et al.

[11] 4,207,404

[45] Jun. 10, 1980

[54] COMPOSITIONS OF CHLORINATED POLYETHYLENE RUBBER AND NYLON

[75] Inventors: Aubert Y. Coran; Raman Patel, both of Akron, Ohio

[73] Assignee: Monsanto Company, St. Louis, Mo.

[21] Appl. No.: 966,838

[22] Filed: Dec. 6, 1978

[51] Int. Cl.² ............................................... C08L 77/00
[52] U.S. Cl. ................................. 525/184; 525/426; 525/66
[58] Field of Search ....... 260/857 L, 857 UN, 857 D; 525/184

[56] References Cited

U.S. PATENT DOCUMENTS

| | | | |
|---|---|---|---|
| 2,851,735 | 9/1958 | Hogg | 18/58 |
| 2,914,496 | 11/1959 | Kelly | 260/23 |
| 3,345,315 | 10/1967 | Barton | 260/857 L |
| 3,464,940 | 9/1969 | Barton | 260/857 L |
| 3,626,026 | 12/1971 | Fukumura | 260/857 L |
| 3,775,521 | 11/1973 | Yamamoto | 264/45 |
| 3,891,958 | 6/1975 | Wakabayashi | 260/857 D |

FOREIGN PATENT DOCUMENTS

| | | | |
|---|---|---|---|
| 47-8936 | 3/1972 | Japan | 260/857 L |
| 77/32527 | 6/1977 | South Africa . | |
| 1444964 | 8/1976 | United Kingdom . | |
| 1445694 | 8/1976 | United Kingdom | 260/857 UN |

*Primary Examiner*—Paul Lieberman
*Attorney, Agent, or Firm*—Larry R. Swaney

[57] ABSTRACT

Thermoplastic compositions are described comprising blends of chlorinated polyethylene rubber and nylon. Cured compositions in which the rubber is cross-linked are also described. The cured compositions are either thermoplastic or thermosets depending upon the curing process used in their preparation.

22 Claims, No Drawings

COMPOSITIONS OF CHLORINATED POLYETHYLENE RUBBER AND NYLON

This invention relates to thermoplastic compositions, and, more particularly, to thermoplastic compositions comprising blends of nylon and chlorinated polyethylene rubber.

BACKGROUND OF THE INVENTION

High molecular weight polymers are generally incompatible with each other. When two different polymers are mixed, the blend exhibits poor mechanical properties, e.g., tensile strength or ultimate elongation. A pair of polymers is seldom sufficiently compatible to give a blend exhibiting mechanical properties as good as the weakest polymer. However, when two polymers are compatible the resulting blend can exhibit a valuable combination of properties, i.e., in addition to good mechanical properties, the blends may also exhibit favorable characteristics, such as temperature and solvent resistance of the individual polymers.

SUMMARY OF THE INVENTION

It has now been discovered that compositions comprising blends of nylon and chlorinated polyethylene (CPE) rubber exhibit useful properties which vary depending on the proportions of nylon and CPE rubber used. Compositions comprising more than 50 percent by weight of nylon exhibit improved impact resistance and excellent high temperature and oil and solvent resistance properties. Compositions comprising more than 50 percent by weight of CPE rubber exhibit improved strength and low hardness. Compositions comprising more than 65 percent by weight of CPE rubber are elastomeric. Chlorinated polyethylene rubber and nylon are compatible in all proportions in the blends of the invention. Accordingly, compositions of the invention comprise blends of about 1–99 parts by weight nylon and, correspondingly, of about 99–1 parts by weight CPE rubber per 100 total parts by weight of nylon and CPE rubber. Preferred compositions comprise blends of about 10–90 parts by weight of the nylon and about 90–10 parts by weight of the CPE rubber per 100 total parts by weight of nylon and CPE rubber. Compositions comprising 20–70 parts by weight of the nylon and 80–30 parts by weight of the CPE rubber per 100 total parts by weight of nylon and CPE rubber are more preferred because they exhibit a balance of properties (tensile strength, modulus, hardness, elongation, elasticity, and flame, oil, solvent and temperature resistance) not obtainable by either of the blend components alone.

Compositions of the invention are prepared by mixing nylon and CPE rubber at a temperature sufficient to soften the nylon, preferably at a temperature above its melting point. Mixing is continued until a homogeneous blend is achieved. The time required to obtain a homogeneous blend varies depending upon the type and proportion of nylon and CPE rubber, the mixing temperature and the efficiency of the mixer used. Homogeneity of the composition is generally readily determined by visual inspection with a uniform appearance indicating that the two components are completely mixed. A hot roll mill is satisfactory for preparing compositions of the invention, but, preferably, the blend components are masticated using conventional masticating equipment, for example, Banbury mixer, Brabender mixer or mixing extruders. Preferably, the nylon should be dry and exposure to air should be minimized.

The compatibility of nylon and CPE rubber and the excellent properties of the blends of the invention are believed to be the consequence of reaction between nylon and CPE rubber during melt mixing. The resulting graft polymer of nylon and CPE rubber serves as a compatibilizing agent for the ungrafted nylon and CPE rubber in the blend. Accordingly, it is understood that compositions of the invention (although defined in terms of the two polymer components) contain a compatibilizing amount of a graft polymer consisting of nylon and CPE rubber linked together. The amount of graft polymer in the blend varies depending upon the time and temperature of mixing and the type and proportions of nylon and CPE rubber. The quantity of graft polymer may be from 0.1 to 30 weight percent based upon the total weight of nylon and CPE rubber but generally the amount of graft polymer is from about 2 to 20 weight percent.

Rubber satisfactory for the practice of the invention comprise essentially amorphous rubbery chlorinated polyethylene which is commonly called and herein shall be referred to as "CPE rubber." CPE rubber has a chlorine content of about 20–55 weight percent, preferably of about 25–50 weight percent and may be prepared by chlorination of crystalline polyethylene. The crystalline polyethylene (either high or low density type) may be reacted with chlorine in an organic solvent or in the form of an aqueous slurry. If the chlorine content is too high to obtain a rubbery polymer, a plasticizer may be added to lower the glass transition temperature to give a rubbery polymer. Polyethylene suitable for chlorination usually has a molecular weight of from about 50,000 to about 5,000,000, preferably has a molecular weight of from about 100,000 to about 3,000,000. The chlorine content of the finished product must be within the indicated range, otherwise, if substantially lower or higher a resinuous nonelastomeric product is obtained. Of course, any halogenated ethylene polymer rubber would be expected to be useful in preparing compositions of the invention, for example, a chlorinated ethylene-propylene rubber. Satisfactory processes for making CPE rubber are described in U.S. Pat. Nos. 3,429,865; 3,227,781; 2,405,971; 2,364,410; and 2,183,556, the disclosures of which are incorporated herein by reference. In CPE rubbers commercially available from the Dow Chemical Company, Midland, Michigan, the chlorine content varies from 36 to 48 percent with the specific gravity increasing with chlorine content from 1.16 to 1.32.

Suitable nylons (polyamide plastics or fiber forming polymers which melt or soften above 100° C.) comprise thermoplastic crystalline or resinous, high molecular weight solid polymers including copolymers and terpolymers having recurring amide units within the polymer chain. Preferably, the nylon has a molecular weight of at least 10,000, more preferably, 20,000 or more. Nylons may be prepared by polymerization of one or more epsilon lactams such as caprolactam, pyrrolidione, lauryllactam and aminoundecanoic lactam, or amino acid, or y condensation of dibasic acids and diamines. Both fiber-forming and molding grade nylons are suitable. Examples of such nylons are polycaprolactam (nylon-6), polylauryllactam (nylon 12), polyhexamethylene adipamide (nylon-6,6), polycaprolactam-polyhexamethylene adipate (nylon-6,6-6), polyhexamethyleneazelamide (nylon-6,9), polyhexamethylenesebacamide (nylon-6,10), polyhexamethylene isophthalamide (nylon-6, IP) and the condensation product of 11-aminoundecanoic acid (nylon 11). Additional examples of satisfactory nylons (especially those having a softening point below 275° C.) are described in Kirk-Othmer, *Encyclopedia of Chemical Technology*, V. 10, page 919, and *Encyclopedia of Polymer Science and Technology*, Vol. 10, pages 392–414. Commercially available thermoplastic nylon may be advantageously used in the practice of the invention, with linear crystalline nylon having a softening point or melting point between 120°–230° C. being preferred.

Compositions of the invention comprising blends of nylon and CPE rubber can be cured by heating with rubber curatives. The properties of the resulting cured composition depends upon the curing process used and the relative proportions of nylon and CPE present. For example, when a blend containing no more than 80 parts CPE rubber per 100 total parts by weight of nylon and CPE rubber is cured by dynamic vulcanization, i.e., the blend is masticated with rubber curatives above the melting temperature of the nylon until the rubber is cured, a composition processable as a thermoplastic is obtained. On the other hand, when a blend containing 25 parts or more CPE rubber per 100 total parts by weight nylon and CPE rubber is cured by static vulcanization, i.e., the blend is held stationary at curing temperature until the rubber is cured, a thermoset composition not processable as a thermoplastic is obtained. The properties of the compositions cured via the static process also vary depending whether the curing temperature used is above or below the nylon melt temperature. The terms "cured" and "cross-linked" are used synonymously herein.

The embodiment of the invention which consists of a thermoplastic cured composition comprises a blend of nylon and cross-linked CPE rubber in the form of small particles (below about 50 microns number average) dispersed throughout the nylon. Preferably, the particle size of the cross-linked CPE rubber is below 15 micron number average and more preferably, is below 2 micron number average. Cross-linking the CPE rubber improves the properties, for example, tensile strength and oil resistance, of the composition. Substantial improvement in properties is observed when the CPE rubber is cross-linked to the extent that the rubber is 50 percent or more insoluble in a rubber solvent. Preferably, the CPE rubber portion of the blend is cross-linked to the extent that the rubber has a gel content of 80 percent or more. The gel content of the rubber is the percent of the rubber insoluble in a rubber solvent such as toluene or tetrahydrofuran at room temperature. The aforesaid compositions, in addition to being thermoplastic, are also elastomeric, when the blend comprises about 60 parts by weight or more of cross-linked CPE rubber per 100 total parts by weight of nylon and CPE rubber.

Thermoplastic compositions of the invention containing cross-linked CPE rubber are preferably prepared by blending a mixture of CPE rubber, nylon and curatives in amounts sufficient to cure the rubber, then masticating the blend at a temperature sufficient to effect cross-link formation, using conventional masticating equipment. The nylon and CPE rubber are mixed at a temperature sufficient to soften the nylon or, more commonly, at a temperature above its melting point. After the nylon and CPE rubber are intimately mixed, curative is added. Heating and masticating at vulcanization temperatures are generally adequate to complete the cross-link formation in a few minutes or less, but if shorter times are desired, higher temperatures may be used. A suitable range of temperatures for cross-link formation commonly ranges from about 110° C. to 265° C. with the maximum temperature varying somewhat depending on the type of CPE rubber, the presence of antidegradants and the mixing time. Typically, the range is from about 150° C. to 230° C. A preferred range of temperature is from about 180° C. to about 220° C. Blends are treated with curatives in amounts and under time and temperature conditions known to give cured products from static cures of the rubber in molds and, indeed, the rubber has undergone gelation to the extent characteristic of rubber subjected to a similar treatment alone. Thermosets are avoided in the thermoplastic compositions of the invention by simultaneously masticating and curing the blends. To obtain thermoplastic cured compositions, it is important that mixing continues without interruption until cross-linking occurs. If appreciable cross-linking is allowed after mixing has stopped, a thermoset unprocessable composition may be obtained. A few simple experiments within the skill of the art utilizing various curative systems will suffice to determine their applicability for the preparation of the improved vulcanized products of this invention.

Methods other than the dynamic vulcanization of rubber/nylon blends can be utilized to prepare thermoplastic cured compositions of the invention. For example, the CPE rubber can be fully vulcanized, in the absence of the nylon, powdered, and mixed with the nylon at a temperature above the melting or softening point of the nylon. Provided that the cross-linked CPE rubber particles are small, well dispersed and in an appropriate concentration, thermoplastic compositions within the invention are easily obtained by melt mixing the cross-linked particulate CPE rubber and nylon. Frequently, the case of poor dispersion or too large rubber particles is visibly obvious to the naked eye and observable in a molded sheet. This is especially true in the absence of pigments and fillers. In such a case, the rubber particles can be comminuted by cold milling to reduce rubber particle size to below about 50 microns rubber average and remolding gives a sheet in which aggregates of rubber particles or large particles are not obvious or are far less obvious to the naked eye and mechanical properties are improved.

The thermoplastic compositions of the invention are all processable in an internal mixer, to products which, upon transferring at temperatures above the softening or crystallizing points of the nylon, to the rotating rolls of a rubber mill, form continuous sheets. The sheets are reprocessable in the internal mixer, after reaching temperatures above the softening or melting points of the nylon. The material is again transformed to the plastic state (molten state of the nylon) but upon passing the molten product through the rolls of the rubber mill a continuous sheet again forms. In addition, a sheet of thermoplastic composition of this invention can be cut into pieces and compression molded to give a single smooth sheet with complete knitting or fusion between the pieces. It is in the foregoing sense that "thermoplastic" will be herein understood. In addition, elastoplastic compositions of the invention are further processable to the extent that articles may be formed therefrom by extrusion, injection molding or calendering.

Another embodiment of the invention which consists of a thermoset composition comprising a blend of nylon and cross-linked CPE rubber in the form of a continuous network rather than being in particulate form. Thermoset compositions of the invention are prepared by first blending nylon and CPE rubber, preferably with stabilizer, at a temperature sufficient to melt the nylon using conventional masticating equipment. The composition is then transferred to a cold mill where curatives are incorporated therein at a temperature below the activation temperature of the curative system. The curable composition is then sheeted by passage through an even speed roll of a mill or a shaped specimen is prepared. The sheet or shaped specimen is then cured by conventional means, typically by heating under pressure. The specimens may be cured either above or below the melting point of the nylon. When a specimen is cured below the nylon melting point, the physical properties of the cured specimen are dependent upon the direction of measurement because of orientation of nylon particles. The degree of anistropy of any particular specimen depends upon the proportions of nylon in the blend and the degree of orientation. Orientation of the nylon particles can be conveniently achieved by passing a sheeted material one or more times through the rolls of an even speed mill.

As indicated above, an improved composition is produced by cross-linking the rubber of a blend to the extent that the composition contains no more than about 50, preferably no more than 40, and more preferably, no more than 20 percent by weight of the CPE rubber extractable in toluene at room temperature. In general, the less extractables the better are the properties, however, respectable properties are obtained with high extractables, but for applications involving contact with organic solvents or oils better compositions comprise low quantities of extractable rubber. The amount of CPE rubber extractable is determined by soaking a thin specimen (about 0.2 mm thick) for 48 hours (or more necessary to extract all the rubber) in toluene at room temperature and weighing the dried (to constant weight) specimen and making suitable corrections based upon knowledge of the composition. Thus, corrected initial and final weights are obtained by subtracting from the initial weight, the weight of soluble components, other than the rubber, such as extender oils, plasticizers, nylon-CPE rubber graft polymer and components of the nylon soluble in the solvent. Any insoluble pigments, fillers, etc., including insoluble nylon, are subtracted from both the initial and final weights.

It should not be assumed that the curative does not react with the nylon. There may be highly significant reactions involved but of limited extent. However, the fact that a large proportion of the nylon can be removed from the composition by extraction with a solvent for the nylon such as formic acid indicates that extensive cross-linking of the nylon has not occurred.

Any curing system suitable for curing CPE rubber may be used in the practice of this invention. Typical curing systems are based on a free-radical generator such as organic peroxides. Frequently, co-agents such as acrylates, triallyl cyanurate, m-phenylene bis-maleimide, etc. are used. Sufficient quantities of curatives are used to cross-link the rubber to the extent necessary to achieve the desired extent of cure. High energy radiation is also utilizable as the curative means.

The properties of the thermoplastic compositions of this invention may be modified by addition of ingredients which are conventional in the compounding of CPE rubber, nylon and blends thereof. Examples of such ingredients include carbon black, silica, titanium dioxide, magnesia, colored pigments, clay, stabilizers, antidegradants, processing aids, coupling agents such as silanes or titanates, adhesives, tackifiers, rubber plasticizers, wax, discontinuous fibers such as wood cellulose fibers and extender oils. The addition of fillers such as carbon black, silica, clay and rubber plasticizer or both, preferably prior to vulcanization, are particularly recommended. Preferably, the filler and/or rubber plasticizer is masterbatched with the rubber and the masterbatch is mixed with the nylon. Filler improves the tensile strength and rubber plasticizer can improve the resistance to oil swell, heat stability, hysteresis, cost and permanent set of the compositions. Plasticizers can also improve processability. For suitable plasticizers, refer to Rubber World Blue Book, supra, pages 145–190. The quantity of plasticizer added depends upon the properties desired, with the upper limit depending upon the compatibility of the particular plasticizer and blend ingredients which limit is exceeded when excessive exuding of plasticizer occurs. Typically, up to 50 parts by weight plasticizer are added per 100 parts by weight of rubber and nylon. Commonly, up to 60 parts by weight of plasticizer are added per 100 parts by weight of CPE rubber in the blend with quantities of about 20–50 parts by weight of plasticizer per 100 parts by weight of rubber being preferred. Typical additions of particulate fillers or reinforcement fillers such as carbon black comprise about 20–150 parts by weight of carbon black per 100 parts by weight of rubber and usually about 25–100 parts by weight carbon black per 100 parts total weight of rubber and plasticizer. The amount of filler which can be used depends, at least in part, upon the type of filler and the amount of plasticizer to be used. The amount of plasticizer depends, at least in part, upon the type of rubber. In addition to the above, nylon plasticizers such as sulfonamide plasticizers also can be used advantageously in compounding compositions of the invention.

Compositions of the invention are useful for making a variety of articles such as tires, hoses, belts, gaskets, moldings, and molded parts. They are particularly useful for making articles by extrusion, injection molding and compression molding techniques. Thermoplastic compositions of the invention also are useful for blending with thermoplastic polymers, in particular, nylon. The compositions of the invention are blended with thermoplastics using conventional mixing equipment. The properties of the resulting blend depend upon the proportions.

The stress-strain properties of the compositions are determined by ASTM procedure D-1708-66. Specimens are pulled with an Instron tester at one inch per minute up to 30% elongation and then 10 inches per minute to failure. The term "elastomeric" as used herein and the claims means a composition which possesses the property of forcibly retracting within ten minutes to less than 160% of its original length after being stretched at room temperature to twice its length and held for ten minutes before release. Especially preferred compositions of the invention are rubbery compositions having tension set values of about 50% or less which compositions approximate the definition for rubber as defined by ASTM Standards, V.28, p. 756 (D1566). More preferred compositions are rubbery compositions having a Shore D hardness of 60 or below or a 100% modulus of 150 Mpa (megapascals) or less or a Young's modulus below 500 Mpa.

DESCRIPTION OF PREFERRED EMBODIMENTS

Compositions of the invention are prepared by charging nylon 6, CPE rubber and stabilizers in the indicated proportions to a Brabender mixer with an oil bath temperature of 225° C. The mixing speed is 150 rpm until the nylon 6 melts and 80 rpm thereafter. The ingredients are then mixed five minutes. The resulting blend is then removed, cooled and test specimens prepared therefrom by compression molding at 250° C. The CPE rubber (Dow CM0342) has a specific gravity of 1.25, chlorine content of 42% and average Mooney 100° C., Viscosity of 60. The stabilizer system consists of 5 parts epoxide stabilizer (Drapex 6.8), 2.0 parts magnesium oxide, 0.5 parts distearylthiodipropanate, and 0.3 parts phenolic antioxidant (Mark 1589B). All parts are by weight per 100 parts by weight of CPE rubber. The effect of the relative proportion of nylon and CPE rubber are shown in Table 1. The data show that the ingredients are compatible since tensile strengths are improved over CPE rubber alone. The data also show that softer compositions (decreasing hardness and Young's modulus, E) result with increasing amounts of CPE rubber. The data further show that oil resistance increases with increasing amounts of nylon. The compositions of stocks 2, 3 and 4 are elastomeric as shown by the tension set data. Solubility and infrared spectroscopy studies (extraction with trifluoroethanol, acetone and toluene) of a specimen of stock 6 indicates that about 15 wt. % of the sample to be a graft polymer of CPE rubber and nylon with about 19 weight % of the graft polymer being nylon. Similar results are obtained with compositions of stock 3.

The effect of dynamically cross-linking the CPE rubber and the effect of stabilizers are shown in Table 2. The CPE rubber is the same as in Table 1. Two different nylons identified in the table are used. A bis-maleimide-peroxide curative system is used in stocks 2 and 3. An acrylate-peroxide curative system is used in stocks 4, 5, and 7. The other ingredients shown comprise the stabilizer system. The amounts are in parts by weight. Stocks 1 and 6 illustrate compositions without curatives. Stocks 5 and 7 illustrate compositions with curatives and stabilizers. Stocks 2-4 illustrate compositions with curatives but without stabilizers. The compositions are prepared by charging nylon, CPE rubber and stabilizers when present to a Brabender mixer at the indicated temperature. The mixing speed is 60 rpm. After the nylon is melted, the acrylate curative is added and then the peroxide curative is added. The mixture is masticated until a maximum consistency is reached and for 2 minutes thereafter. The composition is removed from the mixer, sheeted, then returned and masticated for 2 additional minutes. The composition is then removed, cooled, then specimens prepared by compression molding. The data show that cross-linking the rubber increases the tensile strength and that the presence of stabilizers increases the percent ultimate elongation.

TABLE 1

|  | 1 | 2 | 3 | 4 | 5 | 6 | 7 | 8 | 9 | 10 | 11 |
|---|---|---|---|---|---|---|---|---|---|---|---|
| Nylon-6 | 0 | 10 | 20 | 30 | 40 | 50 | 60 | 70 | 80 | 90 | 100 |
| CPE rubber | 100 | 90 | 80 | 70 | 60 | 50 | 40 | 30 | 20 | 10 | 0 |
| TS, MPa | 6.05 | 9.32 | 8.76 | 12.5 | 16.1 | 22.5 | 28.0 | 37.1 | 42.6 | 49.1 | 57.2 |
| $M_{100}$, MPa | 1.09 | 1.11 | 2.9 | 11.0 | — | — | — | — | — | — | — |
| E, MPa | 2.19 | 6.6 | 6.9 | 48 | 114 | 420 | 657 | 688 | 921 | 1250 | 1280 |
| UE, % | 700 | 660 | 395 | 145 | 98 | 65 | 65 | 49 | 51 | 45 | 41 |
| Shore D | 23 | 28 | 30 | 32 | 50 | 60 | 66 | 68 | 70 | 75 | 75 |
| Tension set, % | 10 | 10 | 15 | 35 | — | — | — | — | — | — | — |
| ASTM #3 Oil Swell Wt. % 70 hours |  |  |  |  |  |  |  |  |  |  |  |
| @ 121° C. | 113 | 102 | 89 | 65 | 28 | 7 | — | 1 | 1 | 1 | — |
| @ 150° C. | 184 | 176 | 124 | 92 | 49 | 10 | — | 2 | 1 | 1 | — |

TABLE 2

| Stocks | 1 | 2 | 3 | 4 | 5 | 6 | 7 |
|---|---|---|---|---|---|---|---|
| Nylon* 6,6-6,6-10 | 40 | 40 | 40 | 40 | 40 | — | — |
| Nylon 6-9, m.p. 210° C. | — | — | — | — | — | 40 | 40 |
| CPE rubber | 60 | 60 | 60 | 60 | 60 | 60 | 60 |
| Magnesium oxide | — | — | — | — | 6 | 6 | 6 |
| Lead stearate | — | — | — | — | 1.2 | 1.2 | 1.2 |
| Epoxide stabilizer | — | — | — | — | 3 | 3 | 3 |
| p-phenylene bis-maleimide | — | 1.2 | 4.8 | — | — | — | — |
| Trimethylolpropane triacrylate | — | — | — | 1.2 | 1.2 | — | 1.2 |
| 2,5-dimethyl-2,5-bis-(t-butylperoxyl)-hexane (90% active) | — | 0.6 | 2.4 | 0.6 | 0.6 | — | 0.6 |
| Brabender temp., °C. | 180 | 160 | 160 | 180 | 180 | 210 | 210 |
| Molding temp., °C. | 210 | 180 | 180 | 210 | 210 | 250 | 250 |
| TS, MPa | 14.7 | 21.8 | 19.5 | 17.2 | 17.9 | 13.8 | 17.3 |
| $M_{100}$, MPa | 8.2 | 8.5 | 10.0 | 6.5 | 12.4 | — | 15.9 |
| UE, % | 340 | 370 | 270 | 350 | 280 | 100 | 160 |
| Tension set, % | 45 | 49 | 45 | 45 | 35 | 59 | 59 |
| Shore D | 40 | 46 | 46 | 35 | 56 | 50 | 59 |
| Soluble rubber |  |  |  |  |  |  |  |
| wt. % of comp. | 45.8 | 18.5 | 9.9 | 24.3 | 19.7 | 38.2 | 21.0 |
| wt. % of rubber | 79.0 | 32.4 | 18.3 | 41.8 | 38.1 | 72.6 | 40.4 |

*Zytel 63, terpolymer of nylon 6 (50%), nylon 6—6(31%) and nylon 6-10 (19%), m.p. 160° C.

Table 3

| | Stock 1 | | | Stock 2 | | | Stock 3 | | | Stock 4 | | | Stock 5 |
|---|---|---|---|---|---|---|---|---|---|---|---|---|---|
| Nylon-6 | 40 | | | 30 | | | 20 | | | 10 | | | 0 |
| CPE rubber | 60 | | | 70 | | | 80 | | | 90 | | | 100 |
| Acrylate co-agent | 2.4 | | | 2.8 | | | 3.2 | | | 3.6 | | | 4 |
| Organic peroxide | 0.6 | | | 0.7 | | | 0.8 | | | 0.9 | | | 1 |
| Cure temperature, °C. | 160 | | 230 | 160 | | 230 | 160 | | 230 | 160 | | 230 | 160 |
| Cure time, minutes | 25 | | 10 | 25 | | 10 | 25 | | 10 | 25 | | 10 | 25 |
| Orientation | 0° | 90° | — | 0° | 90° | — | 0° | 90° | — | 0° | 90° | — | — |
| TS, MPa | 37.8 | 21.1 | 11.3 | 26.7 | 16.3 | 8.9 | 16.8 | 12.2 | 11.8 | 9.8 | 9.6 | 9.5 | 10.6 |
| M100, MPa | — | — | — | — | 13.4 | 6.7 | 14.4 | 5.2 | 7.2 | 7.2 | 3.1 | 5.1 | 1.2 |
| E, MPa | 210 | 84 | 120 | 79 | 25 | 30 | 21 | 7.7 | 12.0 | 8.0 | 5.0 | 8.4 | 2.8 |
| UE, % | 45 | 77 | 62 | 72 | 130 | 180 | 140 | 260 | 210 | 270 | 430 | 350 | 700 |
| Tension set | — | — | — | — | 27 | 29 | 10 | 10 | 10 | 10 | 10 | 9 | 9 |
| Shore D | 50 | 50 | 49 | 47 | 47 | 42 | 30 | 30 | 29 | 28 | 28 | 28 | 21 |
| Soluble rubber wt. % of comp. | 11.9 | | 9.5 | 11.6 | | 8.4 | 14.4 | | 12.4 | 22.0 | | 17.6 | 54.6 |
| wt. % of rubber | 22.1 | | 17.7 | 18.7 | | 13.5 | 20.5 | | 17.7 | 28.2 | | 22.5 | 63.7 |

Thermoset compositions of the invention are illustrated in Table 3. The nylon 6, CPE rubber and stabilizer system and amounts thereof are the same as in Table 1. The acrylate co-agent and organic peroxide are the same as in Table 2. The compositions are prepared by charging nylon 6, CPE rubber, stabilizers and acrylate co-agent to a Brabender mixer at 225° C. Mixing was continued for 3 minutes after the nylon melted. The composition was removed from the mixer and placed on a mill at about 50° C. (a phrase inversion is observed with milling and the nylon becomes a discontinuous phase). Peroxide curative is added on the mill, sheets are then formed by passage through the rolls. The sheets are pressed cured at 160° C. and 230° C. The properties of the sheets cured at 160° C. are measured in the direction of orientation "0°" and perpendicular to the direction of orientation designated "90°". The direction of orientation is the milling direction. Sheets cured at 230° C. (above the melting point of nylon-6) are weaker and exhibit essentially no orientation. All parts are by weight. The properties are shown in Table 3. Stock 5 is a control containing no nylon. The data show that orientation has a substantial effect on physical properties.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. A composition comprising a blend of about 1–99 parts by weight of nylon having a molecular weight of at least 10,000 and about 99–1 parts by weight of chlorinated polyethylene (CPE) rubber having a chlorine content of about 20–55 weight percent, per 100 total parts by weight of nylon and CPE rubber.

2. The composition of claim 1 in which the blend comprises 10–90 parts by weight of nylon and 90–10 parts by weight of chlorinated polyethylene rubber per 100 total parts by weight of nylon and CPE rubber.

3. The composition of claim 2 in which the nylon has a melting point between 120°–230° C.

4. The composition of claim 3 in which the blend comprises 65 parts or more by weight CPE rubber per 100 total parts by weight of nylon and CPE rubber.

5. The composition of claim 2 in which the blend comprises up to 30 weight percent of a graft polymer of nylon and CPE rubber.

6. The composition of claim 5 in which the blend comprises from about 2 to 20 weight percent of a graft polymer of nylon and CPE rubber.

7. The composition of claim 5 prepared by melt mixing.

8. The composition of claim 1 in which the CPE rubber is cross-linked.

9. The composition of claim 2 in which the CPE rubber is cross-linked to the extent that the rubber is at least 60 weight percent or more insoluble in toluene.

10. The composition of claim 9 which is a thermoset.

11. The composition of claim 9 which is thermoplastic.

12. The composition of claim 11 in which the CPE rubber is in the form of dispersed particles of a size of 50 microns number average or less.

13. The composition of claim 12 in which the CPE rubber is cross-linked to the extent that it is at least 80 weight percent or more insoluble in toluene and the particle size is below 15 micron number average.

14. The composition of claim 6 in which the nylon is selected from the group consisting of Nylon-6, Nylon-6,9, Nylon-6,6-6 or blends thereof.

15. The composition of claim 14 in which the nylon is Nylon-6.

16. An elastoplastic composition comprising a blend of about 20 to 40 parts by weight nylon having a molecular weight of at least 10,000 and about 80 to 60 parts by weight CPE rubber having a chlorine content of about 20–55 weight percent, per 100 total parts by weight nylon and CPE rubber in which the CPE rubber is cross-linked to the extent that no more than forty weight percent of the CPE rubber is extractable in toluene and is in the form of dispersed particles of a size of 50 microns number average or below, which composition is processable as a thermoplastic and is elastomeric.

17. The composition of claim 16 in which the CPE rubber is cross-linked to the extent that no more than 20 weight percent of the CPE rubber is extractable in toluene and is in the form of dispersed particles of a size of 15 microns number average or below.

18. The composition of claim 17 in which the CPE rubber is chlorinated polyethylene having a chlorine content of about 25–50 weight percent.

19. The composition of claim 18 in which the nylon has a melting point between 120°–230° C.

20. The composition of claim 19 in which the nylon is selected from the group consisting of Nylon-6, Nylon-6,9, Nylon-6,6-6 or blends thereof.

21. The composition of claim 20 in which the nylon is Nylon-6.

22. The composition of claim 17 prepared by dynamic vulcanization.

* * * * *